United States Patent
Genin et al.

(10) Patent No.: US 10,731,488 B2
(45) Date of Patent: Aug. 4, 2020

(54) TURBOCHARGER TURBINE ASSEMBLY

(71) Applicant: Garrett Transportation I Inc., Torrance, CA (US)

(72) Inventors: Emeric Genin, Jarville (FR); Giorgio Figura, Epinal (FR); Daniel Frank, Badmenil aux Bois (FR)

(73) Assignee: Garrett Transportation I Inc., Torrance, CA (US)

( * ) Notice: Subject to any disclaimer, the term of this patent is extended or adjusted under 35 U.S.C. 154(b) by 7 days.

(21) Appl. No.: 15/888,040

(22) Filed: Feb. 4, 2018

(65) Prior Publication Data
US 2019/0242262 A1 Aug. 8, 2019

(51) Int. Cl.
*F01D 9/04* (2006.01)
*F01D 17/16* (2006.01)
(Continued)

(52) U.S. Cl.
CPC ............ *F01D 9/041* (2013.01); *F01D 17/143* (2013.01); *F01D 17/165* (2013.01); *F01D 25/24* (2013.01);
(Continued)

(58) Field of Classification Search
CPC .... F01D 17/141; F01D 17/143; F01D 17/165; F01D 9/041; F01D 25/24; F04D 29/46; F04D 29/462; F02C 6/12
See application file for complete search history.

(56) References Cited

U.S. PATENT DOCUMENTS

| 6,558,117 B1* | 5/2003 | Fukaya | F01D 17/165 |
| | | | 415/160 |
| 8,684,678 B2* | 4/2014 | Fleig | F01D 17/165 |
| | | | 415/160 |

(Continued)

FOREIGN PATENT DOCUMENTS

| DE | 11 2016 01532 T5 | 1/2018 |
| EP | 2 818 668 A1 | 12/2014 |

(Continued)

OTHER PUBLICATIONS

Yang et al., An investigation of volute cross-sectional shape on turbocharger turbine under pulsating conditions in internal combustions engine, Energy Conservation and Management, 105 (2015) 167-177 (11 pages).

(Continued)

*Primary Examiner* — Richard A Edgar
*Assistant Examiner* — Michael K. Reitz
(74) *Attorney, Agent, or Firm* — Brian J. Pangrle

(57) ABSTRACT

A turbine housing of a turbocharge can include a surface that defines a portion of a volute, an annular surface that extends radially inwardly to define a portion of a pressure chamber that is in fluid communication with the volute, a substantially annular plate that defines a portion of the pressure chamber, an annular component, at least one spacer that defines a minimum axial distance between the substantially annular plate and the annular component to define a nozzle that is in fluid communication with the volute and in fluid communication with a turbine wheel space where, responsive to fluid flow in the volute and through the nozzle to the turbine wheel space, the pressure chamber has a fluid pressure that exceeds a fluid pressure of the nozzle to apply a biasing force to the substantially annular plate in an axial direction toward a center housing.

14 Claims, 11 Drawing Sheets

(51) Int. Cl.
- *F01D 17/14* (2006.01)
- *F01D 25/24* (2006.01)
- *F02C 6/12* (2006.01)
- *F01D 11/00* (2006.01)
- *F01D 11/16* (2006.01)

(52) U.S. Cl.
CPC .............. *F02C 6/12* (2013.01); *F01D 11/005* (2013.01); *F01D 11/16* (2013.01); *F05D 2220/40* (2013.01); *F05D 2240/128* (2013.01); *F05D 2240/14* (2013.01); *F05D 2240/15* (2013.01); *F05D 2240/50* (2013.01); *F05D 2240/55* (2013.01); *F05D 2260/52* (2013.01)

(56) References Cited

U.S. PATENT DOCUMENTS

| | | | | |
|---|---|---|---|---|
| 8,806,867 | B2* | 8/2014 | Hayashi | F01D 17/165 415/160 |
| 8,915,704 | B2* | 12/2014 | Severin | F01D 17/165 415/164 |
| 8,979,508 | B2* | 3/2015 | Mailfert | F01D 17/16 417/380 |
| 2015/0308330 | A1* | 10/2015 | Arnold | F02B 37/24 60/602 |
| 2017/0335758 | A1* | 11/2017 | Giselmo | F01D 11/005 |
| 2018/0030848 | A1 | 2/2018 | Kobayashi et al. | |

FOREIGN PATENT DOCUMENTS

| | | |
|---|---|---|
| EP | 3 032 042 A1 | 6/2016 |
| WO | 2016 095940 A1 | 6/2016 |

OTHER PUBLICATIONS

Dinescu et al., Mean Value Modeling of a Variable Nozzle Turbocharger (VNT), U.P.B. Sci. Bull., Series D, vol. 72, Iss. 1, 2010 (ISSN 1454-2358), pp. 109-116 (8 pages).

EPO Communication/EESR, Application No. 19152971.8-1006, May 27, 2019 (8 pages).

* cited by examiner

TURBOCHARGER TURBINE ASSEMBLY

TECHNICAL FIELD

Subject matter disclosed herein relates generally to turbochargers for internal combustion engines.

BACKGROUND

Exhaust driven turbochargers include a rotating group that includes a turbine wheel and a compressor wheel that are connected to one another by a shaft. The shaft is typically rotatably supported within a center housing by one or more bearings. During operation, exhaust from an internal combustion engine drives a turbochargers turbine wheel, which, in turn, drives the compressor wheel to boost charge air to the internal combustion engine.

BRIEF DESCRIPTION OF THE DRAWINGS

A more complete understanding of the various methods, devices, assemblies, systems, arrangements, etc., described herein, and equivalents thereof, may be had by reference to the following detailed description when taken in conjunction with examples shown in the accompanying drawings where.

DETAILED DESCRIPTION

Below, an example of a turbocharged engine system is described followed by various examples of components, assemblies, methods, etc.

Figure 1:
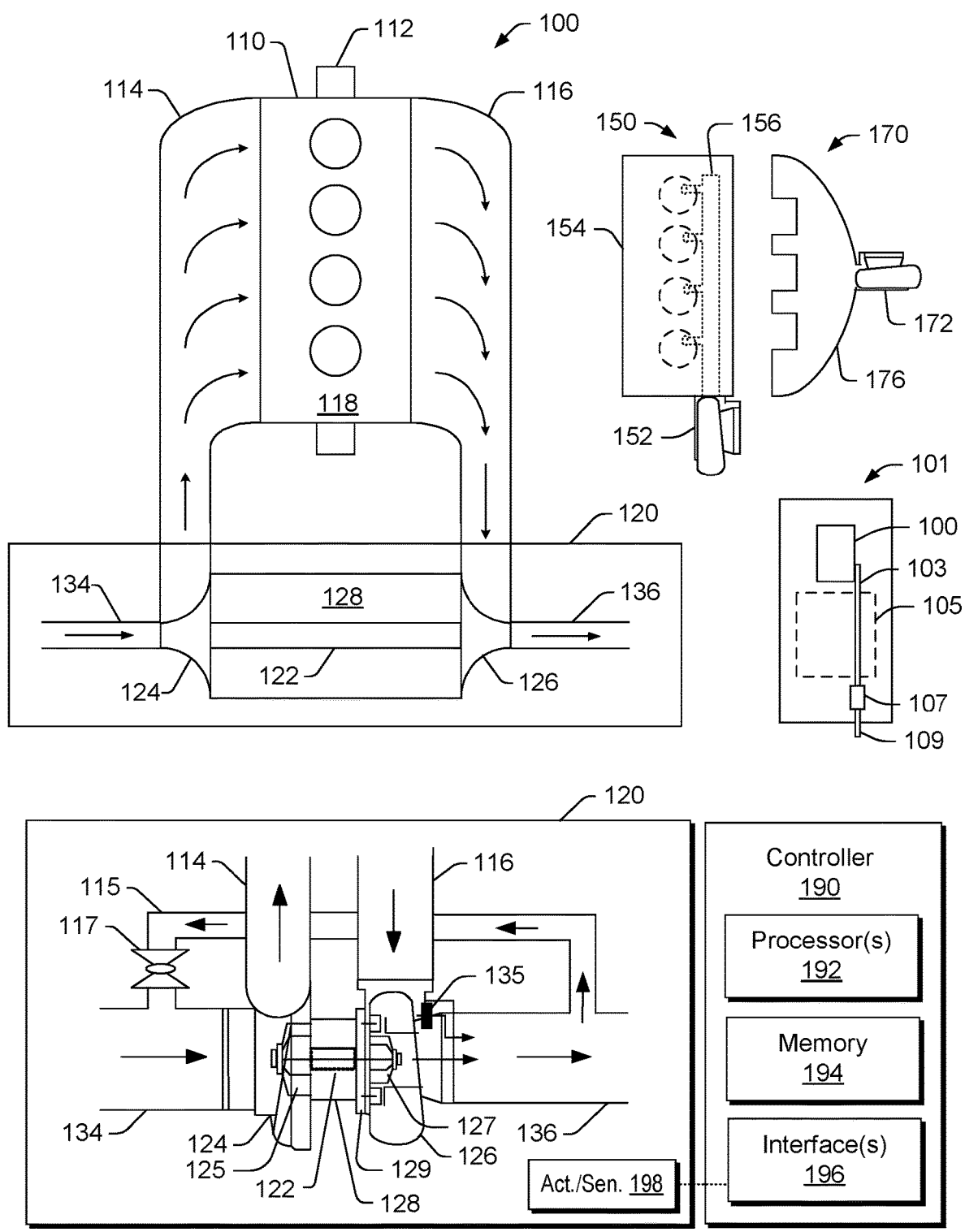
FIG. 1 is a diagram of a turbocharger and an internal combustion engine along with a controller.

Turbochargers are frequently utilized to increase output of an internal combustion engine. Referring to FIG. 1, as an example, a system 100 can include an internal combustion engine 110 and a turbocharger 120. As shown in FIG. 1, the system 100 may be part of a vehicle 101 where the system 100 is disposed in an engine compartment and connected to an exhaust conduit 103 that directs exhaust to an exhaust outlet 109, for example, located behind a passenger compartment 105. In the example of FIG. 1, a treatment unit 107 may be provided to treat exhaust (e.g., to reduce emissions via catalytic conversion of molecules, etc.).

As shown in FIG. 1, the internal combustion engine 110 includes an engine block 118 housing one or more combustion chambers that operatively drive a shaft 112 (e.g., via pistons) as well as an intake port 114 that provides a flow path for air to the engine block 118 and an exhaust port 116 that provides a flow path for exhaust from the engine block 118.

The turbocharger 120 can act to extract energy from the exhaust and to provide energy to intake air, which may be combined with fuel to form combustion gas. As shown in FIG. 1, the turbocharger 120 includes an air inlet 134, a shaft 122, a compressor housing assembly 124 for a compressor wheel 125, a turbine housing assembly 126 fora turbine wheel 127, another housing assembly 128 and an exhaust outlet 136. The housing assembly 128 may be referred to as a center housing assembly as it is disposed between the compressor housing assembly 124 and the turbine housing assembly 126.

In FIG. 1, the shaft 122 may be a shaft assembly that includes a variety of components (e.g., consider a shaft and wheel assembly (SWA) where the turbine wheel 127 is welded to the shaft 122, etc.). As an example, the shaft 122 may be rotatably supported by a bearing system (e.g., journal bearing(s), rolling element bearing(s), etc.) disposed in the housing assembly 128 (e.g., in a bore defined by one or more bore walls) such that rotation of the turbine wheel 127 causes rotation of the compressor wheel 125 (e.g., as rotatably coupled by the shaft 122). As an example a center housing rotating assembly (CHRA) can include the compressor wheel 125, the turbine wheel 127, the shaft 122, the housing assembly 128 and various other components (e.g., a compressor side plate disposed at an axial location between the compressor wheel 125 and the housing assembly 128).

In the example of FIG. 1, a variable geometry assembly 129 is shown as being, in part, disposed between the housing assembly 128 and the housing assembly 126. Such a variable geometry assembly may include vanes or other components to vary geometry of passages that lead to a turbine wheel space in the turbine housing assembly 126. As an example, a variable geometry compressor assembly may be provided.

In the example of FIG. 1, a wastegate valve (or simply wastegate) 135 is positioned proximate to an exhaust inlet of the turbine housing assembly 126. The wastegate valve 135 can be controlled to allow at least some exhaust from the exhaust port 116 to bypass the turbine wheel 127. Various wastegates, wastegate components, etc., may be applied to a conventional fixed nozzle turbine, a fixed-vaned nozzle turbine, a variable nozzle turbine, a twin scroll turbocharger, etc. As an example, a wastegate may be an internal wastegate (e.g., at least partially internal to a turbine housing). As an example, a wastegate may be an external wastegate (e.g., operatively coupled to a conduit in fluid communication with a turbine housing).

In the example of FIG. 1, an exhaust gas recirculation (EGR) conduit 115 is also shown, which may be provided, optionally with one or more valves 117, for example, to allow exhaust to flow to a position upstream the compressor wheel 125.

FIG. 1 also shows an example arrangement 150 for flow of exhaust to an exhaust turbine housing assembly 152 and another example arrangement 170 for flow of exhaust to an exhaust turbine housing assembly 172. In the arrangement 150, a cylinder head 154 includes passages 156 within to direct exhaust from cylinders to the turbine housing assembly 152 while in the arrangement 170, a manifold 176 provides for mounting of the turbine housing assembly 172, for example, without any separate, intermediate length of exhaust piping. In the example arrangements 150 and 170, the turbine housing assemblies 152 and 172 may be configured for use with a wastegate, variable geometry assembly, etc.

In FIG. 1, an example of a controller 190 is shown as including one or more processors 192, memory 194 and one or more interfaces 196. Such a controller may include circuitry such as circuitry of an engine control unit (ECU). As described herein, various methods or techniques may optionally be implemented in conjunction with a controller, for example, through control logic. Control logic may depend on one or more engine operating conditions (e.g., turbo rpm, engine rpm, temperature, load, lubricant, cooling, etc.). For example, sensors may transmit information to the controller 190 via the one or more interfaces 196. Control logic may rely on such information and, in turn, the controller 190 may output control signals to control engine operation. The controller 190 may be configured to control lubricant flow, temperature, a variable geometry assembly (e.g., variable geometry compressor or turbine), a wastegate (e.g., via an actuator), an electric motor, or one or more other components associated with an engine, a turbocharger (or turbochargers), etc. As an example, the turbocharger 120 may include one or more actuators and/or one or more sensors 198 that may be, for example, coupled to an interface or interfaces 196 of the controller 190. As an example, the wastegate 135 may be controlled by a controller that includes an actuator responsive to an electrical signal, a pressure signal, etc. As an example, an actuator for a wastegate may be a mechanical actuator, for example, that may operate without a need for electrical power (e.g., consider a mechanical actuator configured to respond to a pressure signal supplied via a conduit).

Figure 2:
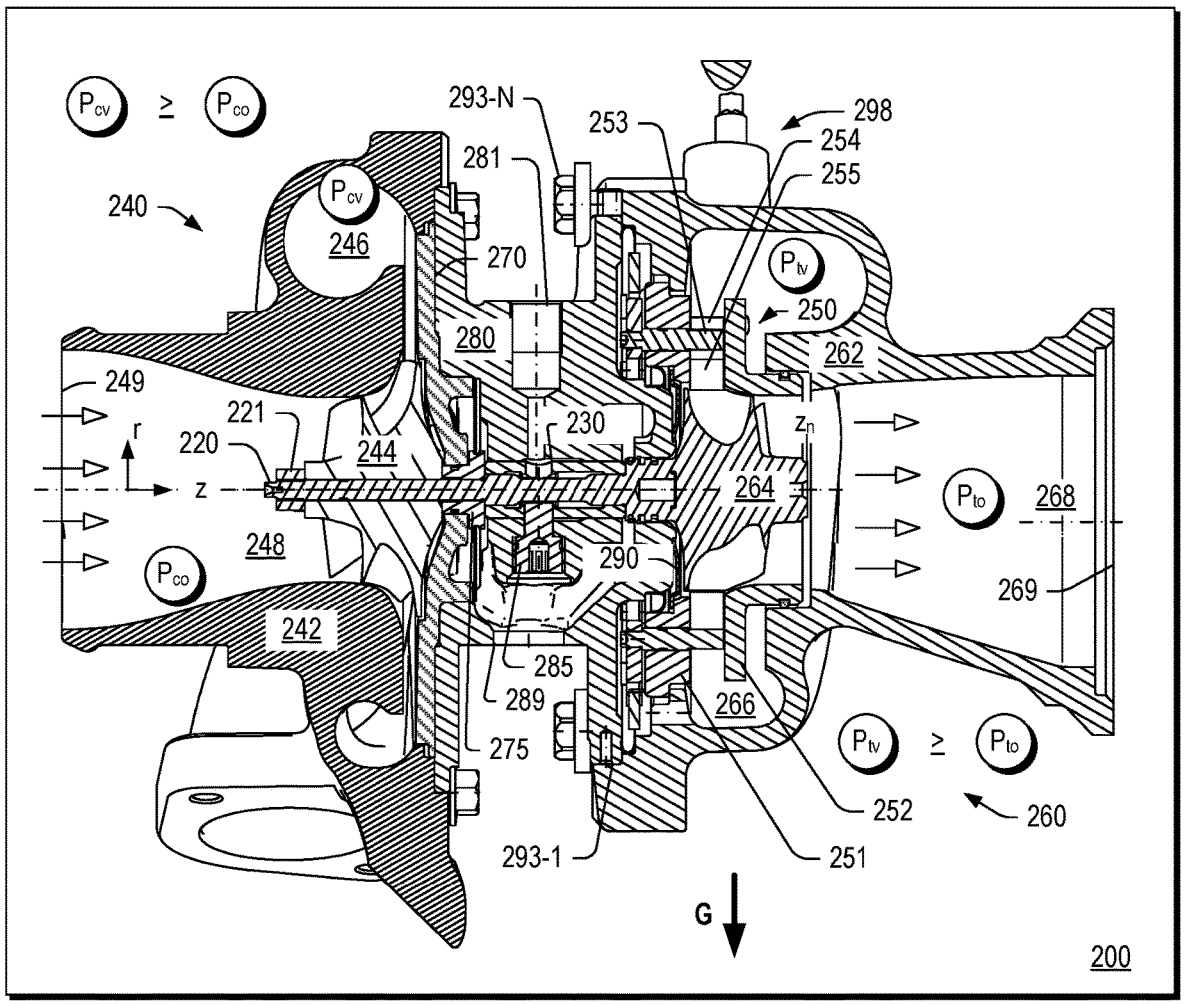
FIG. 2 is a cutaway view of an example of a turbocharger.

FIG. 2 shows an example of a turbocharger assembly 200 that includes a shaft 220 supported by a bearing 230 (e.g., a journal bearing, a bearing assembly such as a rolling element bearing with an outer race, etc.) disposed in a bore (e.g., a through bore defined by one or more bore walls) of a housing 280 between a compressor assembly 240 that defines a compressor side (left) and a turbine assembly 260 that defines a turbine side (right). The compressor assembly 240 includes a compressor housing 242 that defines a volute 246 and that houses a compressor wheel 244. As shown in FIG. 2, the turbine assembly 260 includes a turbine housing 262 that defines a volute 266 and that houses a turbine wheel 264. The turbine wheel 264 may be, for example, welded or otherwise attached to the shaft 220 to form a shaft and wheel assembly (SWA) where a free end of the shaft 220 allows for attachment of the compressor wheel 244.

As an example, a wheel, whether a turbine wheel or a compressor wheel, can include an inducer portion and an exducer portion, for example, characterized in part by an inducer radius ($r_i$) and an exducer radius ($r_e$). As an example, an individual blade can include an inducer edge (e.g., a leading edge) and an exducer edge (e.g., a trailing edge). A wheel may be defined in part by a trim value that characterizes a relationship between inducer and exducer portions.

For a compressor wheel, the inducer portion can be characterized by a "minor" diameter; whereas, for a turbine wheel, the inducer portion can be characterized by a "major" diameter. During operation, inlet flow to a compressor wheel or a turbine wheel occurs with respect to its inducer portion and outlet flow from a compressor wheel or a turbine wheel occurs with respect to its exducer portion.

As to air flow, during operation of the turbocharger 200, air can be directed from the compressor wheel 244 to the volute 246 via a diffuser section defined in part by the compressor housing 242 and a compressor side plate 270 as the compressor wheel 244 rotates, drawing air into a passage 248 via an inlet 249, both of which may be defined by the compressor housing 242. As indicated in FIG. 2, during operation of the turbocharger 200, the compressor wheel 244 acts to boost air pressure such that air pressure in the volute 246 ($P_{cv}$) is greater than air pressure in the passage 248 ($P_{co}$). Rotation of the compressor wheel 244 can generate a negative pressure that acts to "suck" air into the compressor assembly 240 and to direct such air to the volute 246 via the diffuser section. As an example, where exhaust gas recirculation (EGR) is implemented, environmental air may be mixed with exhaust (e.g., upstream and/or downstream of the compressor wheel 244).

In the example of FIG. 2, an axial locating pin 285 is received in an opening of the bearing 230, which may be a cross-bore of the bearing 230. As an example, one or more other types of axial locating mechanisms may be included in a turbocharger that act to limit axial movement of a bearing (e.g., and/or movement in one or more other directions). As an example, a locating pin may allow for radial movement of a bearing, which may allow for effective operation of one or more lubricant films disposed about a surface of the bearing.

In the example of FIG. 2, the shaft 220 includes a step (e.g., a shoulder) that forms an axial annular face. In the example of FIG. 2, a thrust collar 275 (e.g., a type of collar) includes a surface that is seated against the axial annular face of the shaft 220. In such an example, a lock nut 221 can include threads that match threads of an end portion of the shaft 220 such that tightening of the lock nut 221 with respect to the shaft 220 loads the compressor wheel 244 and the thrust collar 275 against the axial annular face of the shaft 220, which can place the shaft 220 (e.g., from the step to its end portion) in tension. In such an example, the shaft 220, the compressor wheel 244 and the lock nut 221 can rotate as a unit (e.g., responsive to exhaust driving the turbine wheel 264). As shown in the example of FIG. 2, the compressor side plate 270 can include a bore (e.g., an opening) in which at least a portion of the thrust collar 275 is positioned where the thrust collar 275 (and/or the compressor side plate 270) can include a groove or grooves that may seat a seal element or seal elements (e.g., O-rings, piston rings, etc.).

In the example of FIG. 2, the turbine assembly 260 includes a variable geometry assembly 250, which may be referred to as a "cartridge" (e.g., the cartridge 250), that may be positioned using an annular component or flange 251 (e.g., optionally shaped as a stepped annular disc or annular plate) of the cartridge 250 that clamps between the housing 280 and the turbine housing 262, for example, using bolts 293-1 to 293-N and a heat shield 290 (e.g., optionally shaped as a stepped annular disc), the latter of which is disposed between the cartridge 250 and the housing 280 and may be resilient in that it can apply a biasing force. As shown in the example of FIG. 2, the cartridge 250 includes a shroud component 252 and the annular component 251. As an example, one or more mounts or spacers 254 may be disposed between the shroud component 252 and the annular component 251, for example, to axially space the shroud component 252 and the annular component 251 (e.g., forming a nozzle space).

As an example, vanes 255 may be positioned between the shroud component 252 and the annular component 251, for example, where a control mechanism may cause pivoting of the vanes 255. As an example, the vane 255 may include a vane post 253 that extends axially to operatively couple to a control mechanism, for example, for pivoting of the vane 255 about a pivot axis defined by the vane post 253.

As to exhaust flow, during operation of the turbocharger 200, higher pressure exhaust in the volute 266 passes through passages (e.g., a nozzle or nozzles, a throat or throats, etc.) of the cartridge 250 to reach the turbine wheel 264 as disposed in a turbine wheel space defined at least in part by the cartridge 250 and at least in part by the turbine housing 262. After passing through the turbine wheel space, exhaust travels axially outwardly along a passage 268 defined by a wall of the turbine housing 262 that also defines an opening 269 (e.g., an exhaust outlet). As indicated, during operation of the turbocharger 200, exhaust pressure in the volute 266 ($P_{tv}$) is greater than exhaust pressure in the passage 268 ($P_{to}$).

As an example, exhaust pressure in the turbine assembly 260 can depend on position or positioning of the vanes 255. For example, closing and/or opening of the vanes 255 (e.g., narrowing or widening throats) can effect exhaust gas pressure at one or more locations.

While FIG. 2 shows a general direction of gravity (G, Earth's gravity), the orientation of the turbocharger 200 may be in an orientation in an engine compartment that is suitable for operation given particulars of lubricant feed, flow and drainage.

As an example, a turbine assembly of an exhaust gas turbocharger can include vanes as part of a variable geometry turbine (VGT) or variable nozzle turbine (VNT). Vanes may be disposed at least in part in a cartridge where the cartridge is disposed between a turbine housing and a center housing of a turbocharger.

As an example, a cartridge may include a shroud component and an annular component spaced axially by mounts (e.g., spacers) where vanes are accommodated to control exhaust flow from a volute to a turbine wheel space. As an example, a vane may include a trailing edge and a leading edge with a pressure side airfoil and a suction side airfoil that meet at the trailing edge and the leading edge. Such a vane may have a planar upper surface and a planar lower surface where a clearance exists between the planar upper surface and the shroud component (e.g., between a lower planar surface of an annular portion of the shroud component) and/or where a clearance exists between the planar lower surface and the annular component (e.g., between an upper planar surface of an annular portion of the annular component).

As an example, each vane may include an axis about which the vane may pivot (e.g., a pivot axis). As an example, each vane may include a post (e.g., or axle) that defines a pivot axis. As an example, a post may be integral with a vane (e.g., cast as a single piece of metal, alloy, etc.) or a post may be a separate component that can be operatively coupled to a vane.

As an example, movement of a vane (e.g., arcwise) may be less closer to the pivot axis and greater further away from the pivot axis. For example, a trailing edge or a leading edge may be disposed a distance from the pivot axis such that upon pivoting of a vane, the leading edge and/or the trailing edge sweeps a maximum arc of the vane for a desired amount of pivoting. If clearance between an upper surface of a vane and a shroud component is diminished, the vane may bind, where the risk may increase depending on arc length as interaction area can increase with respect to arc length. In such an example, deformation to a shroud component may cause a vane or vanes to bind upon pivoting or even in a static position. Binding can result in loss of control, stress to a control mechanism, wear, etc.

As an example, forces acting on a vane and/or a post of a vane may cause a vane or vanes to bind upon pivoting or even in a static position. Binding can result in loss of control, stress to a control mechanism, wear, etc.

As to pressure differentials and temperatures in a variable geometry turbine assembly, as an example, exhaust in a volute may have pressure in a range of approximately 120 kPa to approximately 400 kPa and possible peak pressure of up to approximately 650 kPa (absolute) and, for example, temperature in a range of approximately 150 degrees C. to approximately 980 degrees C.; whereas, at a location axially downstream of a turbine wheel, exhaust may have pressure in a lower range and temperature in a lower range. Exhaust gas temperatures in a gasoline fuel internal combustion engine may exceed those of a diesel fuel internal combustion engine. Where a variable geometry turbine assembly is utilized with a gasoline fuel internal combustion engine, the environment may be harsher in terms of temperature when compared to a diesel fuel internal combustion engine.

As an example, one or more components of a variable geometry turbine assembly (e.g., VGT assembly or variable nozzle turbine (VNT) assembly) can include at least a portion made of a material that can withstand pressures and temperatures in the aforementioned ranges. For example, a material can be the INCONEL® 718 alloy (Specialty Materials Corporation, New Hartford, N.Y.). Some other examples of materials include INCONEL® 625, C263 (aluminum-titanium age hardening nickel), René 41 (nickel-based alloy), WASPALOY® alloy (age hardened austenitic nickel-based alloy, United Technologies Corporation, Hartford, Conn.), etc.

As an example, a cartridge can include vanes that are disposed at least in part between two components. As an example, at least a portion of a vane may be made of a material such as HK30, which is a chromium-nickel-iron stainless steel alloy including approximately 30% chromium and 20% nickel, with the balance being predominantly iron (percentages by mass). As an example, at least a portion of a vane may be made of a HK series stainless steel alloy that includes about 18-22% nickel by mass. Such an alloy can be fully austenitic. As an example, one or more components of a cartridge may be made of a material such as, for example, PL23 alloy or SS310 alloy.

As an example, an exhaust gas variable geometry turbine assembly can include a number of pivotable vanes that define, at least in part, throats within an exhaust gas nozzle where each of the pivotable vanes includes a corresponding post.

Figure 3A:
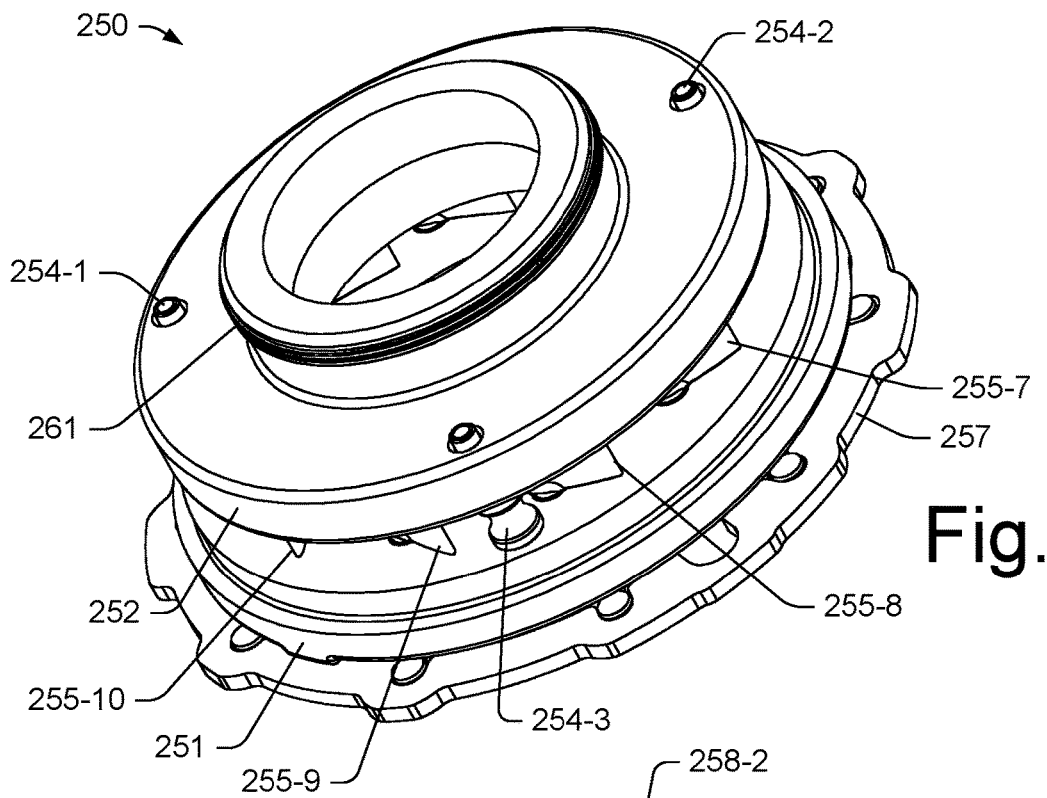
FIGS. 3A and 3B are perspective views of an example of a cartridge of a turbocharger.
Figure 3B:
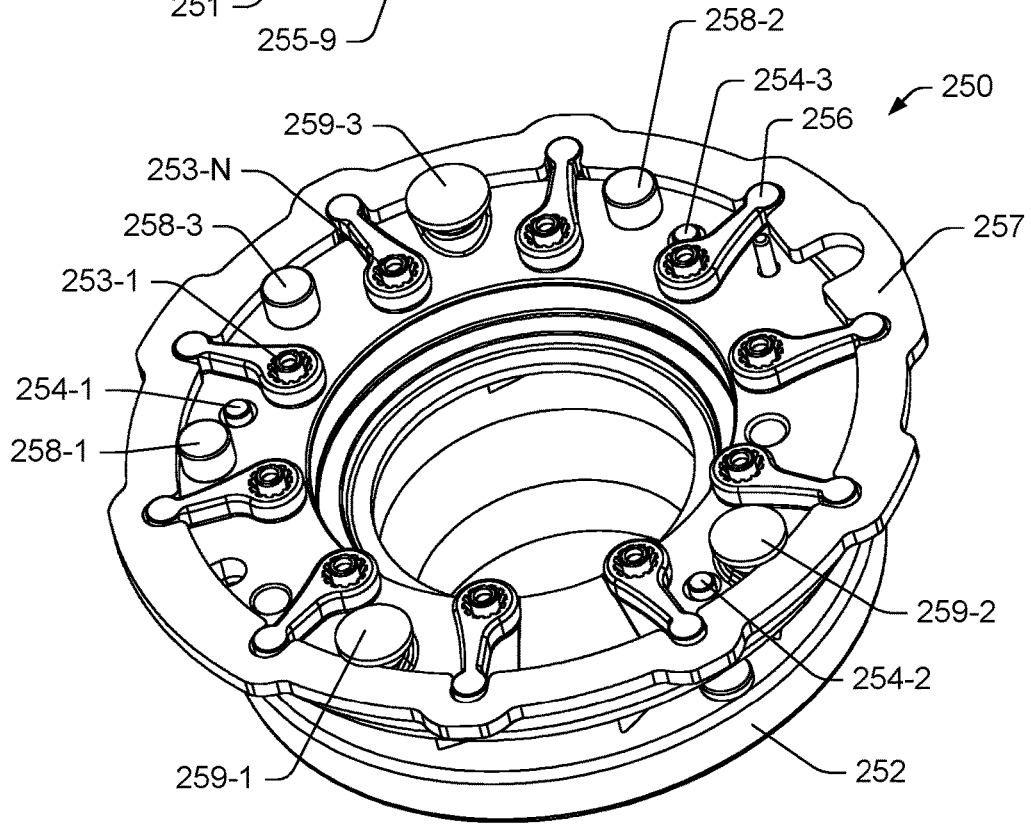

FIGS. 3A and 3B show perspective views of the example cartridge 250 of FIG. 2. These perspective views show one or more seal rings 261 seated in a groove or grooves of the shroud portion 252, a plurality of spacers 254-1, 254-2 and 254-3, a plurality of vanes 255 (e.g., 255-1 to 255-N) and corresponding vane posts 253-1 to 253-N, a plurality of vane control arms 256, a unison ring 257, a plurality of pins 258-1, 258-2 and 258-3, and a plurality of guides 259-1, 259-2 and 259-3. In the example of FIGS. 3A and 3B, the unison ring 257 may be rotated about a central axis (e.g., substantially aligned with the axis of rotation of a turbine wheel) to cause the plurality of vane control arms 256 to rotate about respective post axes of individual vane posts 253 of the plurality of vanes 255. The plurality of pins 258-1, 258-2 and 258-3 and the plurality of guides 259-1, 259-2 and 259-3 may help to align the unison ring 257 with respect to other components of the cartridge 250.

In the example of FIGS. 3A and 3B, one or more ends of the spacers 254-1, 254-2 and 254-3 may be fixed (e.g., riveted, capped, etc.). For example, an end of a spacer may be flattened to a radius that is greater than an opening of a passage through which the spacer extends such that the spacer cannot be moved axially into the passage (e.g., a bore, etc.). In the example of FIGS. 3A and 3B, the cartridge 250 may be secured as a cartridge unit via riveting ends of the spacers 254-1, 254-2 and 254-3, which fixes an axial distance between the shroud component 252 and the annular component 251 at a given temperature (e.g., an ambient temperature during assembly). Such a riveting process may introduce some amount of stress at the passages (e.g., bores) of the shroud component 252 and/or the annular component 251 through which the spacers 254-1, 254-2 and 254-3 pass.

Figure 4:
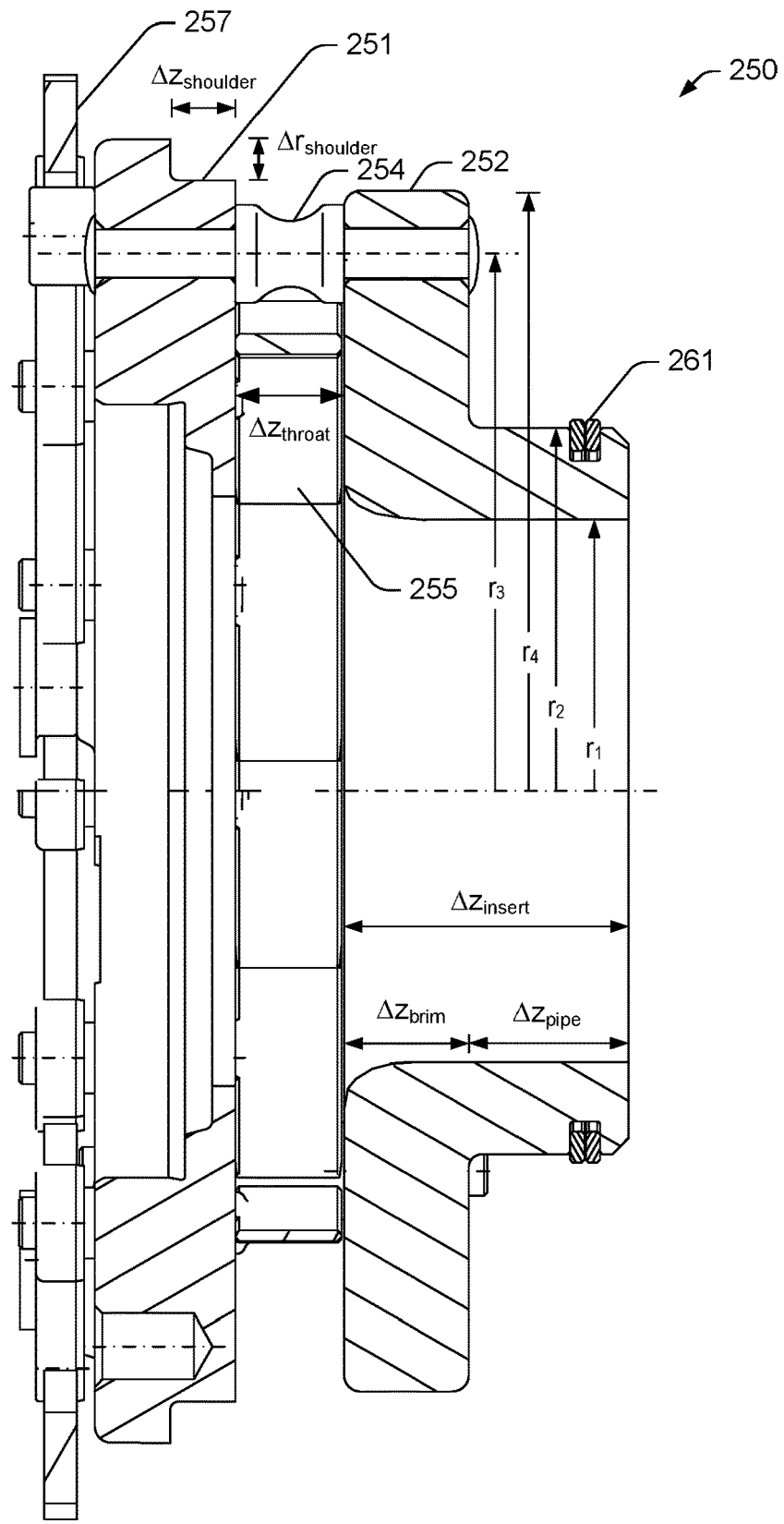
FIG. 4 is a cutaway view of the cartridge of FIGS. 3A and 3B.

FIG. 4 shows a cutaway view of the cartridge 250 of FIGS. 3A and 3B. Various dimensions are shown in FIG. 4 with respect to a cylindrical coordinate system ($\Theta$, r, z) with a central axis z where the cutaway view is a 180 degree view that illustrates cross-sections in the r,z-plane. Radial dimensions include a radius $r_1$ from the central axis z to an inner surface of the shroud component 252 that defines in part a turbine wheel space, a radius $r_2$ from the central axis z to an outer surface of the shroud component 252 where a portion of the shroud component 252 that is between $r_1$ and $r_2$ may be referred to as a pipe portion of the shroud component 252, a radius $r_3$ from the central axis z to the spacer 254 axis (e.g., parallel to the central z axis), and a radius $r_4$ from the central axis z to an outer perimeter of the shroud component 252 where a portion of the shroud component 252 that is between $r_2$ and $r_4$ may be referred to as a brim portion of the shroud component 252.

The shroud component 252 can be shaped substantially as a hat with the pipe portion extending axially away from the brim portion. As to a cross-sectional profile, the shroud component 252 has a substantially L-shaped cross-sectional profile as formed by the pipe portion and the brim portion. As shown in FIG. 4, the shroud component 252 is a single piece that can be formed from a single piece of stock material, cast as a single piece, etc. As an example, the shroud component 252 may be machined to form one or more features. For example, the shroud component 252 may be drilled to form openings for axial support and/or positioning of a plurality of spacers (see, e.g., the spacer 254). As shown in FIG. 4, the shroud component 252 can be defined by an axial dimension $\Delta z_{insert}$, which may be a sum of an axial brim dimension $\Delta z_{brim}$ and an axial pipe dimension $\Delta z_{pipe}$.

As shown in FIG. 4, the vane 255 is disposed at least in part between the annular component 251 and the shroud component 252 where an axial distance between the components 251 and 252 may be defined at least in part by the spacer 254.

As shown in FIG. 4, the spacer 254 can include a portion with an axial dimension and a diameter where the diameter is larger than the diameter of a axial extensions of the spacer 254 where one axial extension passes through an opening of a passage (e.g., a bore) in the annular component 251 where it is flared or capped and where another axial extension passes through an opening of a passage (e.g., a bore) in the shroud component 252 where it is flared or capped. In such an example, the spacing axial spacing between the annular component 251 and the shroud component 252 can be fixed to define an axial throat dimension (see, e.g., $\Delta z_{throat}$).

As mentioned, an exhaust turbine assembly can be exposed to high temperatures. For example, consider a relatively small turbocharger with a variable nozzle cartridge (VNT cartridge) that is specified for use in an internal combustion engine application where a maximum temperature of the VNT cartridge may be in excess of approximately 700 degrees C. and, for example, less than approximately 1000 degrees C. Changes in temperature can cause one or more materials to expand (e.g., according to geometry, size, material of construction, forces, etc.). Depending on types of material(s) used, shapes of components, clearances, tolerances, etc., stresses can occur, particularly with respect to the annular component 251, the shroud component 252 and the spacers 254, which, in turn, may affect one or more clearances of the vanes 255. Where a vane binds (e.g., contacts a surface with a high amount of friction), control of a VNT cartridge (or VGT cartridge) may be effected. Further, vanes may add to stress or stresses of a cartridge.

Referring again to FIG. 2, as mentioned, the heat shield 290 may be resilient in that it may act as a spring. For example, the heat shield 290 can contact the housing 280 and the annular component 251 such that the cartridge 250 is forcibly biased against the housing 262. For example, the housing 262 can include an annular step that includes a stop surface that limits the axial movement of the annular component 251 and hence the cartridge 250. As shown in FIGS. 2, 3 and 4, the annular component 251 includes an annular step or annular shoulder that is at a position radially outward from the spacer 254, which includes the portion that extends through an opening of a passage through the annular component 251 and the portion that extends through an opening of a passage through the shroud component 252. In the example of FIG. 4, an annular shoulder of the annular component 251 is shown to include an axial dimension $\Delta z_{shoulder}$ and a radial dimension $\Delta r_{shoulder}$.

Figure 5:
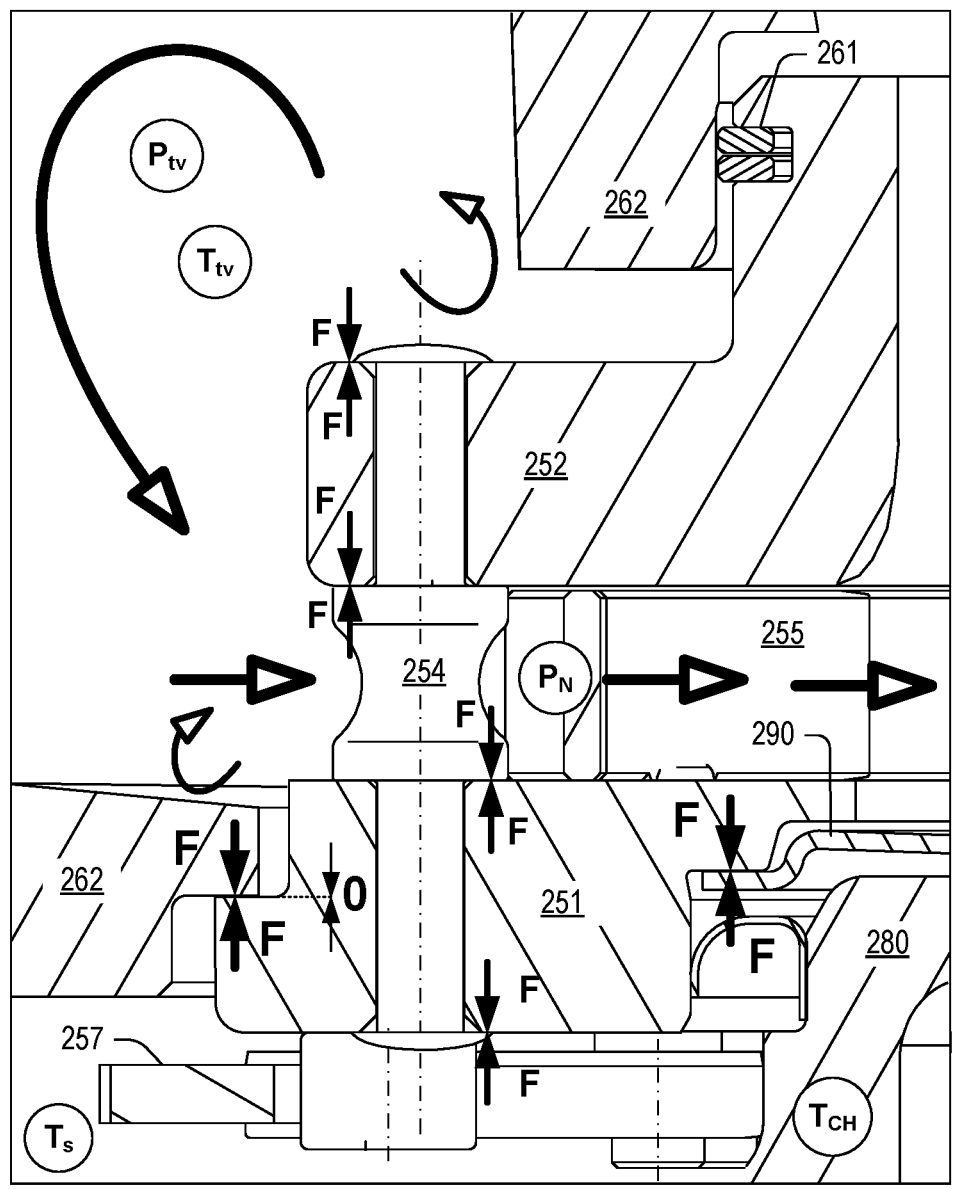
FIG. 5 is a cutaway view of a portion of the turbocharger of FIG. 2 in an operational state.

FIG. 5 shows a portion of the cartridge 250 in spatial relationship with the turbine housing 262 and the center housing 280 along with various operational parameters that represent examples of operational conditions. For example, the turbine volute (tv) includes a volute pressure ($P_{tv}$) and a volute temperature ($T_{tv}$), the throat or nozzle includes a nozzle pressure ($P_N$), the center housing (CH) 280 includes a center housing temperature ($T_{CH}$) and a space that exists between the center housing 280, the turbine housing 262 and the annular component 251 includes a space temperature ($T_s$).

As shown in FIG. 5, exhaust flows in the volute with various rotational cross-sectional flow profiles where the exhaust flows from the volute to the nozzles (e.g., throats) defined by adjacent vanes 255, the shroud component 252 and the annular component 251. Volute shape can influence vortex formation, vortex size, pressure loss, etc. In the example of FIG. 5, the volute can include a main vortex and one or more minor vortexes. Such vortexes may be referred to as secondary flows or secondary flow patterns, which can depend on type of flow to a volute (e.g., pulsating, steady, etc.). An article by Yang et al., entitled "An investigation of volute cross-sectional shape on turbocharger turbine under pulsating conditions in internal combustion engine", Energy Conversion and Management, 105 (2015), 167-177, is incorporated by reference herein.

As shown in FIG. 5, the pressure in the volute ($P_{tv}$) is greater than the pressure in the nozzles ($P_N$) where a pressure difference can be defined between the two pressures. As indicated in FIG. 5, the pressure difference is accompanied by a velocity difference (e.g., via Bernoulli's principle) where the shroud component 252 has a higher average velocity on its nozzle facing surface compared to its volute facing surface such that a "lift" force is axially downward in a direction from the shroud component 252 toward the annular component 251. In the approach of FIG. 5, as the spacer 254 (e.g., spacers 254-1, 254-2, and 254-3) fix the axial distance between the shroud component 252 and the annular component 251, the "lift" force does not result in any change in the axial distance. Ignoring temperature effects during operation or non-operation, the axial distance remains the same; noting that temperature changes may result in some amount of change in axial distance due to thermal coefficients of expansion (or contraction), which may be complicated due to the annular component 251 and the shroud component 252 being connected and fixed by the spacers 254-1, 254-2 and 254-3 (e.g., as riveted at ends, etc.). For example, thermal stresses may be generated where such stresses may cause distortions to the shroud component 252 in part because the spacers 254-1, 254-2 and 254-3 are connected to the annular component 251. In such an example, where the shroud component 252 expands the spacers 254-1, 254-2 and 254-3 may hinder such expansion such that stress builds and distorts the shroud component 252. Distortion of the shroud component 252 can affect clearance(s) with respect to a turbine wheel (e.g., consider rotational profile of a turbine wheel). Where clearances change, performance may change, which may change in a detrimental manner. Where a clearance is reduced, a risk exists for contact between a shroud component and a turbine wheel, which may result in catastrophic failure of a turbine wheel and/or turbine housing (e.g., or one or more other components of a turbocharger).

The example of FIG. 5 also shows various force arrows (e.g., approximate force and/or reaction force vectors). As shown, the shoulder of the annular component 251 is in contact with a mating shoulder of the turbine housing 262 such that there is zero clearance and a force and reaction force. Forces can be imposed by the heat shield 290, which may apply a biasing force axially upwardly away from the center housing 280. Forces are also shown with respect to the spacer 254 where various interfaces can exist where the annular component 251 and the shroud component 252 are clamped at least in part by the spacer 254.

Figure 6:
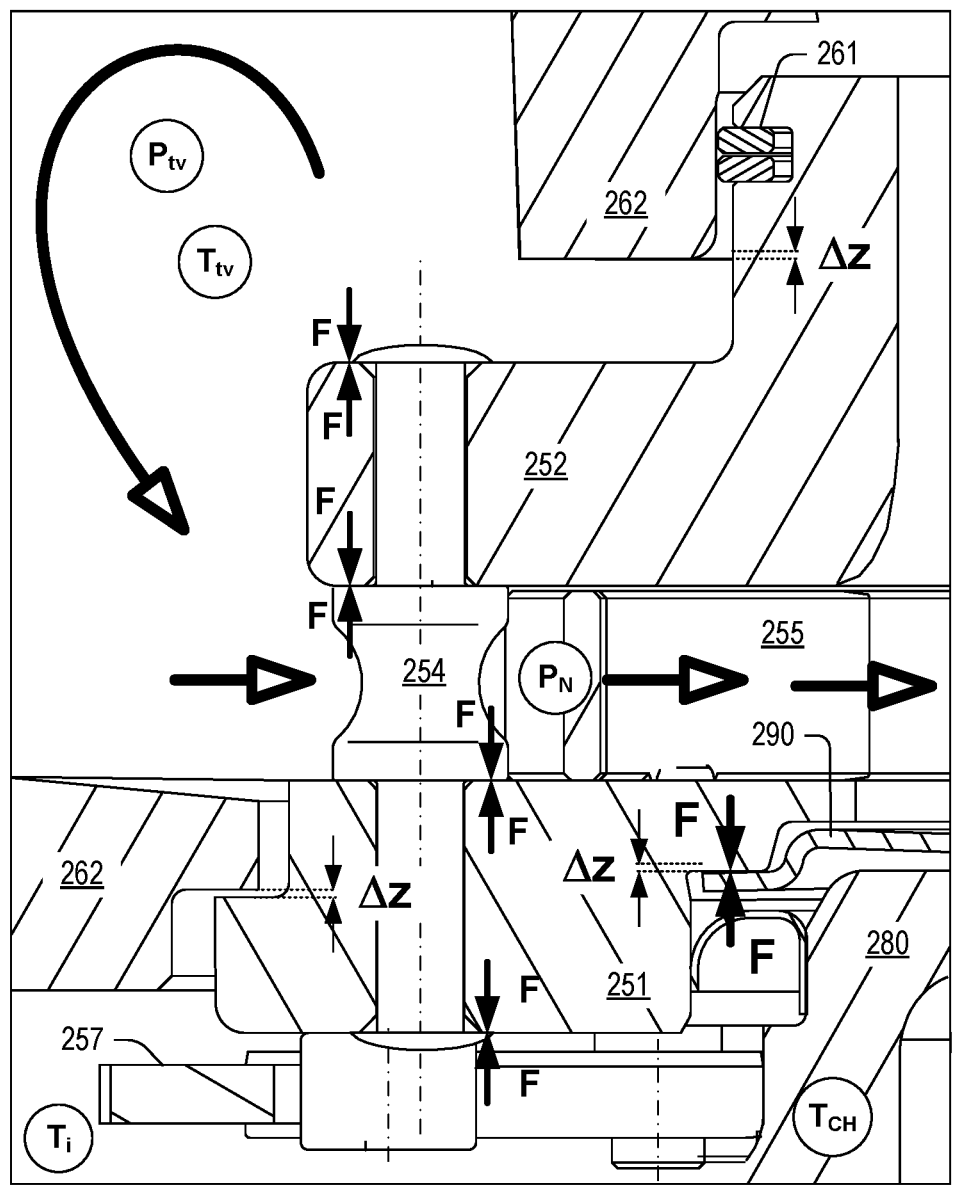
FIG. 6 is a cutaway view of a portion of the turbocharger of FIG. 2 in an operational state.

FIG. 6 shows the assembly of FIG. 5 where the cartridge 250 is displaced axially in comparison to the cartridge 250 of FIG. 5. As shown, the shoulder of the annular component 251 is axially displaced by a distance Δz with respect to the mating shoulder of the turbine housing 262 such that the annular component 251 is not in direct contact with the turbine housing 262. In such an example, the heat shield 290 may apply an increased force that acts to push the cartridge 250 axially upwardly away from the center housing 280. As indicated, the one or more seal rings 261 may slide against a surface of the turbine housing 262 where the cartridge 250 moves axially.

FIGS. 5 and 6 show that the cartridge 250 may move axially while the axial distance between the annular component 251 and the shroud component 252 remains constant (e.g., ignoring temperature effects).

Figure 7:
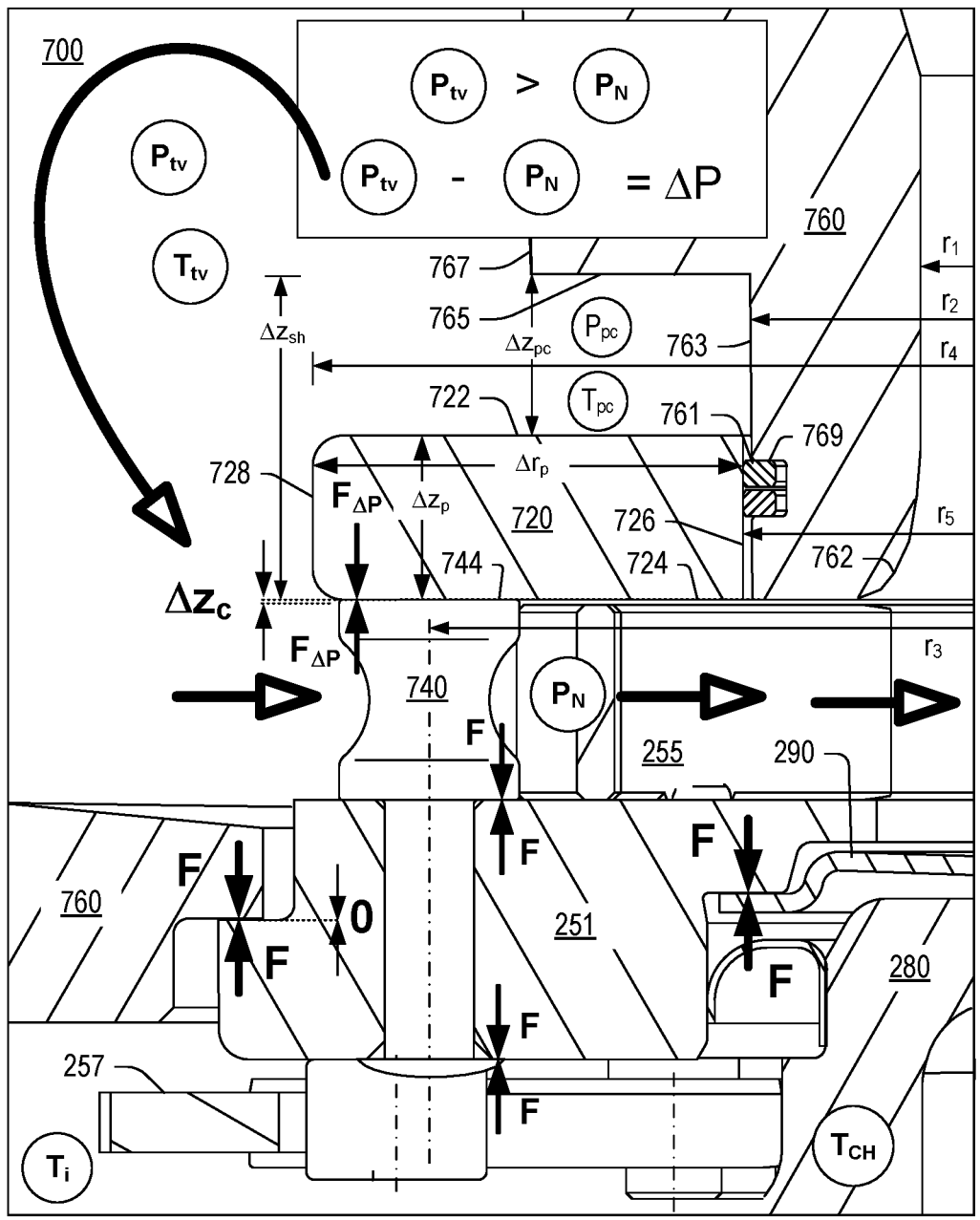
FIG. 7 is a cutaway view of a portion of an example of a turbine assembly of a turbocharger in an operational state.
Figure 7:
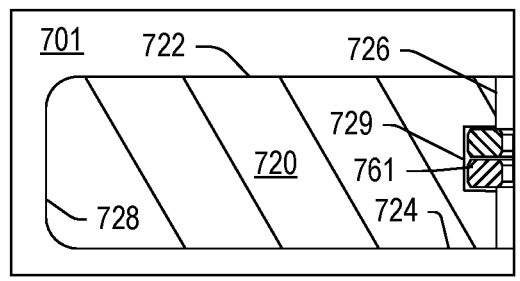
Figure 7:
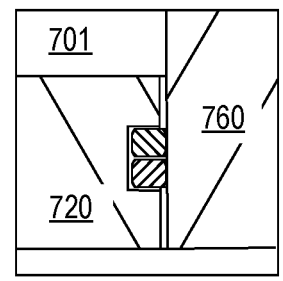

FIG. 7 shows an example of a portion of an assembly 700 where the assembly 700 may include various components as in the turbocharger 200, the cartridge 250, etc. FIG. 7 also shows an example of a variation of the assembly 700, labeled assembly 701.

With respect to the assembly of FIGS. 5 and 6, the assembly 700 and the assembly 701 differ at least in part in that they include a substantially annular plate 720, which may be a floating component that defines in part a portion of a nozzle or nozzles (e.g., a throat or throats). The assemblies 700 and 701 also differ as to a turbine housing 760 when compared to the turbine housing 262.

FIG. 7 shows various dimensions that can be referenced to a cylindrical coordinate system (Θ, r, z) with a central z-axis, which can be an axis defined by a rotational axis of a turbine wheel that is centered with respect to a turbine wheel space as defined by various components of the assemblies 700 and 701.

Radial dimensions include a radius $r_1$ from the central axis z to an inner surface that extends to a shroud 762 of the turbine housing 760 that defines in part a turbine wheel space, a radius $r_2$ from the central axis z to an outer surface 763 of the turbine housing 760 such that a portion of the turbine housing 760 has a radial thickness (e.g., a pipe portion that includes the shroud surface 762), a radius $r_3$ from the central axis z to an axis of a spacer 740 axis (e.g., parallel to the central z axis), a radius $r_4$ from the central axis z to an outer surface 728 of the substantially annular plate 720, an a radius $r_5$ from the central axis z to an inner surface 726 of the substantially annular plate 720.

In the examples of FIG. 7, in comparison to the shroud component 252 of FIG. 4, the substantially annular plate 720 can be a brim (see, e.g., radii $r_2$ and $r_4$ of the brim portion of the shroud component 252 as shown in FIG. 4), which may be a "floating" brim, in that a pressure differential may cause the substantially annular plate 720 to move axially or to be axially biased (e.g., while the turbine housing 760 remains stationary with respect to the substantially annular plate 720). As shown in FIG. 7, the substantially annular plate 720 is pipe-less when compared to the shroud component 252 because the turbine housing 760 includes a pipe portion that includes a shroud portion as defined by the shroud surface 762 (e.g., a pipe that has an inner surface that is exposed to exhaust flowing past a turbine wheel). As such, the housing 760 may be referred to as a piped housing, with a pipe portion that includes the shroud surface 762 (see, e.g., the pipe portion of the shroud component 252 of the cartridge 250 as shown in FIG. 4).

In the example of FIG. 7, the substantially annular plate 720 may be an annular component that can be defined with respect to a cylindrical coordinate system (Θ, r, z) where a z-axis can be a central axis that may be substantially aligned with a rotational axis of a turbine wheel disposed in a turbine space defined at least in part by the shroud surface 762 of the housing 760. As to substantial alignment of axes, such an approach may aim to achieve a substantially uniform clearance in 360 degrees about a turbine wheel disposed in the turbine wheel space. Such a clearance may be a design clearance that may, during operation, vary slightly due to movement of one or more components, temperature, etc. In general, a uniform clearance is desirable as performance models (e.g., numerical models, etc.) may be specified using such a uniform clearance, which is generally sufficient to account for slight movements, expansions, etc., such that a turbine wheel does not contact the shroud surface 762 during operation, as such contact may cause catastrophic failure of a turbocharger.

In the example of FIG. 7, the substantially annular plate 720 has a substantially rectangular cross-sectional profile (radial and axial); noting that one or more corners may be chamfered, rounded, etc., which may be shaped to as to aerodynamics of exhaust flow (e.g., to reduce losses, reduce turbulence, reduce eddy formation, etc.). As shown, the substantially annular plate 720 can be defined by the inner surface 726 at an inner radius or diameter, the outer surface 728 at an outer radius or diameter and opposing surfaces 722 and 724 that extend between the surfaces 726 and 728 (e.g., between the inner radius or diameter and the outer radius or diameter). In such an example, the opposing surfaces 722 and 724 can include a high pressure surface 722 and a low pressure surface 724 as a result of pressures during operation of a turbocharger. For example, the high pressure surface 722 can be a surface that defines at least a portion of a volute while the low pressure surface 724 can be a surface that defines at least a portion of a nozzle or a throat (e.g., or nozzles or throats as may be defined by adjacent vanes).

In the example of FIG. 7, the substantially annular plate 720 may be a pressure biased plate that may float when a pressure differential across opposing surfaces is zero. In a floating state, the substantially annular plate 720 may move responsive to orientation with respect to gravity; noting that one or more seal rings 761 may be included in the assembly 700 that may apply some amount of frictional force against a portion of the substantially annular plate 720, which may resist movement with respect to gravity (Earth's gravity). As an example, a turbocharger may be orientated in a relatively gravity neutral orientation with respect to a substantially annular plate (e.g., where the axis of such a plate is orthogonal to gravity when a vehicle is on a horizontal surface).

In the example of FIG. 7, the assembly 700 is shown as including an annular groove 769 inset in a portion of the turbine housing 760 such that the one or more seal rings 761 can be fit in the annular groove 769 and compressed to allow for positioning of the substantially annular plate 720, which can include the inner surface 726 without one or more annular grooves. For example, the one or more seal rings 761 can be compressed and the substantially annular plate 720 can be axially positioned such that the one or more seal rings 761 can expand outwardly to contact the inner surface 726 to hinder flow of exhaust between the surfaces 726 and 763.

FIG. 7 also shows an example of the substantially annular plate 720 in as part of the assembly 701; however, the inner surface 726 includes an annular groove 729 that can seat the one or more seal rings 761. In such an example, the one or more seal rings 761 may be seated at least partially in the annular groove 729 prior to positioning the substantially annular plate 720 over a pipe portion of a turbine housing. FIG. 7 shows an example of the assembly 701 with the turbine housing 760 where the surface 763 does not include one or more annular grooves such as the annular groove 769. In the example assembly 701, the substantially annular plate 720 may translate axially along the pipe portion of the turbine housing (e.g., outer surface of pipe portion) between the surface 744 of the spacer 740 and a surface of the turbine housing (see, e.g., the surface 765) without a risk of the one or more seal rings 761 becoming unseated. As to unseating, depending on dimensions, for the assembly 700, the substantially annular plate 720 may translate axially upwardly a distance where the surface 722 rises above the annular groove 769. Such a condition may be avoided where, for example, a biasing and/or frictional force of the one or more seal rings 761 as to the substantially annular plate 720 is sufficient to hinder movement of the substantially annular plate 720 due to gravity or where the dimensions do not allow the surface 724 of the substantially annular plate 720 to pass axially above the one or more seal rings 761 (e.g., the position of the annular groove 769).

As shown in FIG. 7, the substantially annular plate 720 may be disposed annularly about a portion of the turbine housing 760, which may be a pipe portion that includes a shroud portion that includes the shroud surface 762. As shown, the substantially annular plate 720 does not form a portion of a shroud of a turbine wheel space; rather, the turbine housing 760 forms the shroud of the turbine wheel space. In such an approach, movement of the substantially annular plate 720 does not affect one or more clearances between the shroud (see shroud surface 762), as formed by the turbine housing 760, and a turbine wheel set in the turbine wheel space. In FIG. 7, the assembly 700 and the assembly 701 can include a clearance defined by the radii $r_2$ and $r_5$ that is bridged by the one or more seal rings 761. In such an example, the one or more seal rings 761 can be resilient and accommodate thermal expansion and/or thermal contraction of one or more components (e.g., the turbine housing 760 and the substantially annular plate 720) while providing a labyrinth structure that helps to hinder flow of exhaust from a pressure chamber (see, e.g., pressure $P_{pc}$) to the nozzle (e.g., a short circuit of exhaust flow from the volute to the nozzle and past vanes set therein). Such an approach can help to manage forces such as stresses that may develop in the assembly of FIGS. 5 and 6, which may act to distort the shroud component 252 and/or one or more other components.

In the example of FIG. 7, during operation, pressures act to bias the substantially annular plate 720 axially downwardly toward the spacer 740, which is not physically attached or connected to the substantially annular plate 720. The spacer 740 can include a contact surface 744 (e.g., a flat contact surface) that is disposed at an axial position that defines a minimum axial distance of the nozzle or throat shown in FIG. 7. In such an example, the minimum axial distance can be slightly greater than an axial height of the vane 255 (e.g., $\Delta z_{vane}$) such that the vane 255 has ample clearance for movement thereof (e.g., pivoting of the vane 255 in the nozzle space between the annular component 251 and the substantially annular plate 720). The clearance may be defined by an axial dimension $\Delta z_c$.

In the example of FIG. 7, as the substantially annular plate 720 is not directly attached or connected to the spacer 740, it may expand and/or contract responsive to changes in temperature without being constrained by the spacer 740. Further, the one or more seal rings 761 may be resilient (e.g., piston rings, etc.) to allow for expansion and/or contraction of the substantially annular plate 720 without binding as to an annular surface 763 of the turbine housing 760.

As to assembly of the various components of the assembly 700, the turbine housing 760 can include a radially extending surface 765 that meets a volute surface 767 at a radial distance from an axis of a turbine wheel space (e.g., $z_{th}$) that is to be aligned with a rotational axis of a turbine wheel (e.g., $z_{tw}$). In such an example, the substantially annular plate 720 can be positioned about the shroud portion of the turbine housing 760 as may be guided by the annular surface 763 and may be limited as to axial position by the surface 765. In the example of FIG. 7, the radial length of the substantially annular plate 720 ($\Delta r_p$) is greater than the radial extent of the surface 765 such that at least a portion of the surface 722 is within the volute regardless of the axial position of the substantially annular plate 720. Further, as shown, the entire surface 722 may be exposed to volute gas (e.g., exhaust gas in the volute) when the surface 722 of the substantially annular plate 720 is not in contact with the surface 765 of the turbine housing 760.

In the example of FIG. 7, the turbine housing 760 includes the surface 767 as a concave surface that defines a portion of a volute where the surface 767 extends to the substantially annular surface 765 of the turbine housing 760 that extends radially inwardly in a direction toward a longitudinal axis of a turbine wheel space to define a portion of a pressure chamber (pc) that is in fluid communication with the volute such that the pressure of the pressure chamber $P_{pc}$ is substantially the same as in the volute $P_{tv}$ and, for example, the exhaust temperature of exhaust in the pressure chamber $T_{pc}$ is substantially the same as that of the volute $T_{tv}$. As shown in FIG. 7, the pressure chamber can be an annular (e.g., ring shaped) space defined by surfaces 763, 765 and 722 while being open to the volute at a radially outward extent (e.g., an open sided chamber with three other sides being defined by three solid surfaces). In the example of FIG. 7, the pressure chamber is defined by an axial dimension $\Delta z_{pc}$, which may change depending on the axial position of the substantially annular plate 720. In the example of FIG. 7, the surface 765 of the turbine housing 760 is at an axial dimension $\Delta z_{sh}$ from the surface 744 of the spacer 740, which in the state of the assembly 700 is approximately a sum of $\Delta z_{pc}$ and $\Delta z_p$. As mentioned, one or more seal elements such as the one or more seal rings 761 may be utilized to hinder leakage of the pressure chamber from the pressure chamber to a nozzle or throat space. As mentioned, one or more components may include one or more annular grooves for seating a seal element such as a seal ring (e.g., or seal rings, etc.). In the example of FIG. 7, the one or more seal rings 761 can allow for sliding of the substantially annular component 720 at least axially while hindering flow of exhaust from the volute to the nozzle (or throats).

In the example of FIG. 7, the axial dimension $\Delta z_{sh}$ between an axial position of the surface 744 and an axial position of the surface 765 is shown to be greater than the dimension $\Delta z_p$. As an example, such an axial dimension may be approximately at least 1.05 times the dimension $\Delta z_p$ and may be less than approximately 5 times the dimension $\Delta z_p$ (noting that such a factor can define in part an axial dimension of the pressure chamber for a state of an assembly). As shown in the example of FIG. 7, the axial dimension $\Delta z_{sh}$ is approximately 2 times the dimension $\Delta z_p$.

Figure 9:
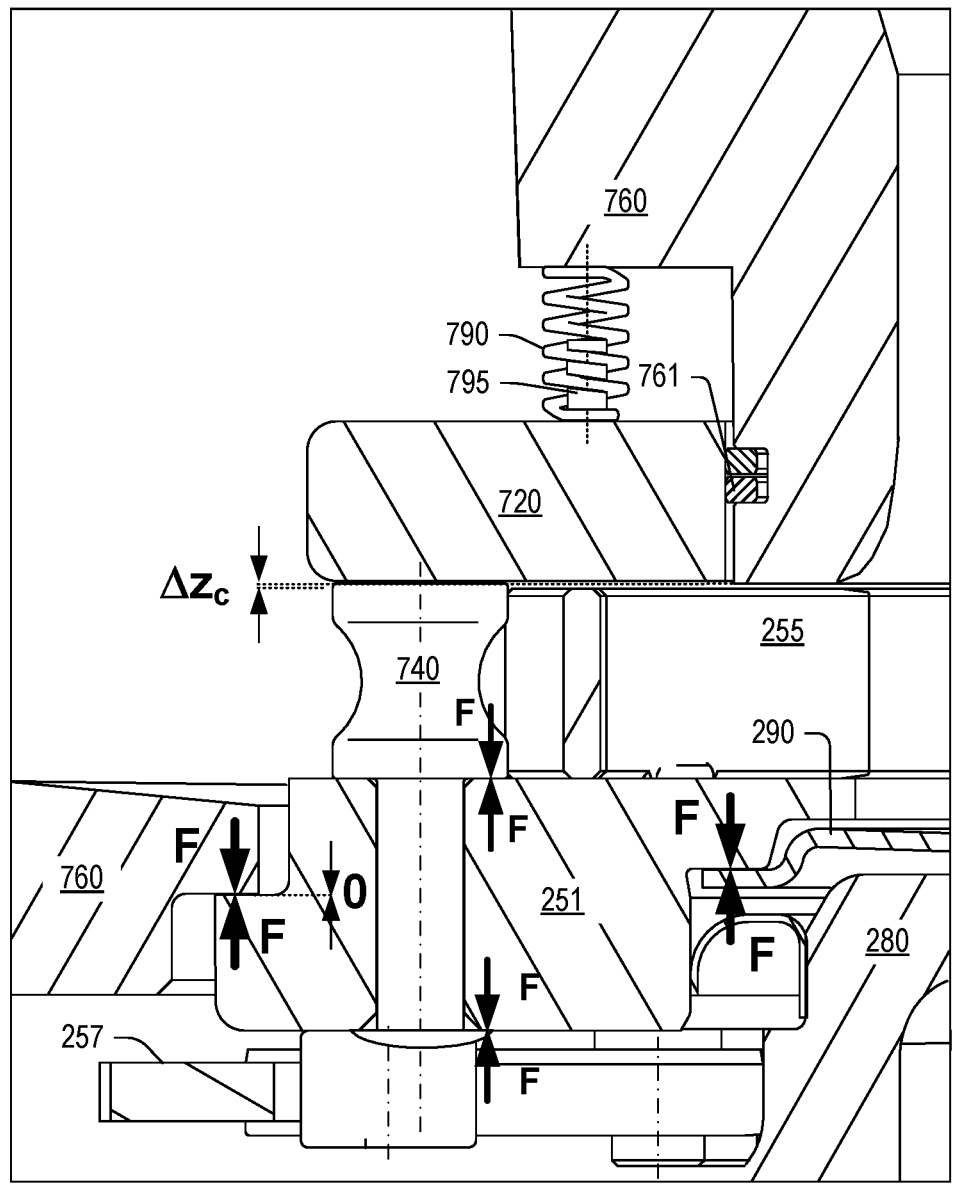
FIG. 9 is a cutaway view of a portion of an example of a turbine assembly of a turbocharger in an operational state.

As an example, one or more dimensions may be selected to provide adequate material strength for the substantially annular plate 720 (e.g., to avoid risk of warping, etc.) while providing sufficient formation of a volute surface by the turbine housing 760. As shown in FIG. 7, the surface 765 is at an axial position that is between the shroud surface 762 and a portion of the turbine housing 760 where the pipe begins to widen (see, e.g., the straight horizontal line and change in slope of the pipe inner surface of the turbine housing 760). As mentioned, dimensions may be selected to avoid displacement of a substantially annular plate with respect to one or more seal rings. For example, where an axial dimension between the surface 765 and the surface 744 is less than approximately 1.5 times $\Delta z_p$, the surface 724, depending on the position of a seating groove, a substantially annular plate may be prevented from axially passing the annular groove 769 (e.g., to avoid unseating). As mentioned, where the arrangement of the substantially annular plate 720 of the assembly 701 is utilized, unseating may be avoided as the one or more seal rings 761 can move with the substantially annular plate 720 (e.g., whether such movement is due to a pressure differential and/or gravity). As an example, an approach as illustrated in FIG. 9, which may utilize a spring and/or a post, may be arranged to avoid unseating of the one or more seal rings 761.

In the example of FIG. 7, the substantially annular plate 720 includes the axial dimension $\Delta z_p$, which may be relatively constant between the surface 722 and the surface 724, for example, from the inner surface 726 to the outer surface 728. In such an example, the substantially annular plate 720 may be an annular plate where the surfaces 722 and 724 are parallel; noting that the surfaces 726 and 728 may be substantially parallel at least over a portion of each of the surfaces 726 and 728. As mentioned, the substantially annular plate 720 can include a substantially rectangular cross-sectional profile, noting that corners may be radiused, chamfered, etc.

In the example of FIG. 7, the annular component 251 may be biased via the heat shield 290 such that the annular component 251 is in contact with the turbine housing 760, which may include a mating shoulder as described with respect to the turbine housing 262.

In FIG. 7, various force arrows are shown, which include pressure forces due to contact between the surface 744 of the spacer 740 and the surface 724 of the substantially annular plate 720. In such an example, expansion and/or contraction forces (e.g., temperature related, etc.) are not coupled to the spacer 740; consequently, thermal stress in the substantially annular component 720 is not transferred to the annular component 251. Further, as mentioned, the substantially annular component 720 is not constrained by the spacer 740 as to radial expansion and/or contraction such that distortion of the substantially annular component 720 can be reduced (e.g., minimal, negligible or eliminated).

In FIG. 7, if the annular component 251 moves axially, the substantially annular component 720 may follow where pressure biases its surface 724 against the surface 744 of the spacer 740.

Figure 8:
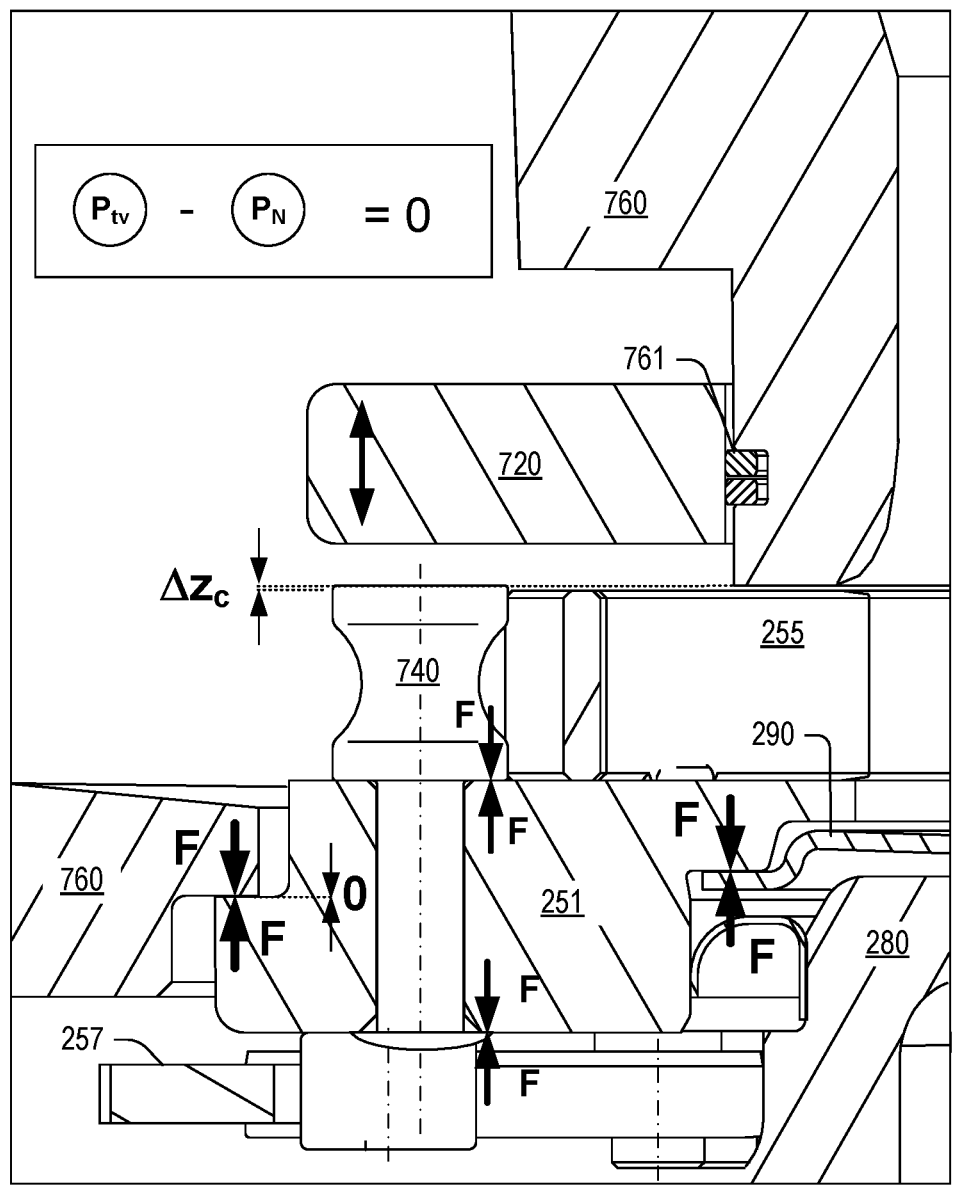
FIG. 8 is a cutaway view of the portion of the example of a turbine assembly of FIG. 7 another operational state.

FIG. 8 shows an example scenario of the assembly 700 of FIG. 7 in a floating state, which can be a non-operational state. In such a state, a portion of the turbine housing 760 can be an annular portion that defines a portion of a nozzle such that exhaust flow does not bypass the vane 255. Specifically, flow from the volute may bypass a portion of the vane 255; however, as the turbine housing 760 forms a portion of a nozzle space, flow is still directed through nozzles (e.g., throats) and such flow may be at a velocity that generates a pressure differential that is sufficient to "suck" the substantially annular plate 720 axially downwardly such that the surface 724 contacts the surface 744 of the spacer 740. Thus, even in a scenario where the substantially annular plate 740 may be momentarily stuck with a gap between the surfaces 724 and 744, flow is still directed through nozzles that have at least an upper bounding surface and a lower bounding surface.

FIG. 9 shows an example of the assembly 700 where a spring 790 is positioned at least in part between the turbine housing 760 and the substantially annular plate 720. Such a spring may be, for example, a coil spring, which may be located via one or more features. For example, the substantially annular plate 720 can include a post 795 that acts to help maintain the location of the spring 790. As shown, the post 795 may be operatively coupled to the substantially annular plate 720. As an example, the post 795 may be operatively coupled to the housing 760, additionally or alternatively (e.g., where the post 795 does not prevent axial movement as biased by the spring 790.

In the example of FIG. 9, the spring 790 may be selected based on a spring constant (e.g., $F(z)=kz$, per Hooke's law, etc.), which may be sufficient to avoid movement of the substantially annular plate 720 with respect to gravity (e.g., optionally in combination with one or more other springs (e.g., consider two or more springs).

As mentioned, an article by Yang et al., entitled "An investigation of volute cross-sectional shape on turbocharger turbine under pulsating conditions in internal combustion engine", Energy Conversion and Management, 105 (2015), 167-177, is incorporated by reference herein. Yang et al. describes pulsating conditions with respect to flow in a volute. As an example, a spring such as the spring 790 may be utilized to damp axial movement of the substantially annular plate 720 as may be expected to be caused by pulsating conditions as caused by operation of one or more combustion cylinders in an internal combustion engine (e.g., where the pressure $P_{pc}$ as shown in FIG. 7 pulses with respect to time responsive to pulsations of the exhaust gas in the volute (e.g., pulsations in $P_{tv}$). For example, pulsating conditions as to exhaust flow to a volute may cause movement (e.g., vibration, etc.) of a floating substantially annular plate as the pressure in the pressure chamber varies with the pulsations. In such an example, a spring or springs may be utilized to damp such movement(s). As mentioned, a substantially annular plate may be designed with a profile that is aerodynamic as to a portion that extends into a volute and/or defines a portion of a volute. Such a profile may be shaped in a manner that helps to reduce the effect of pulsations in exhaust flowing to the volute. Such a profile may help to increase cycle averaged efficiency and may optionally be implemented in combination with one or more springs.

Figure 10:
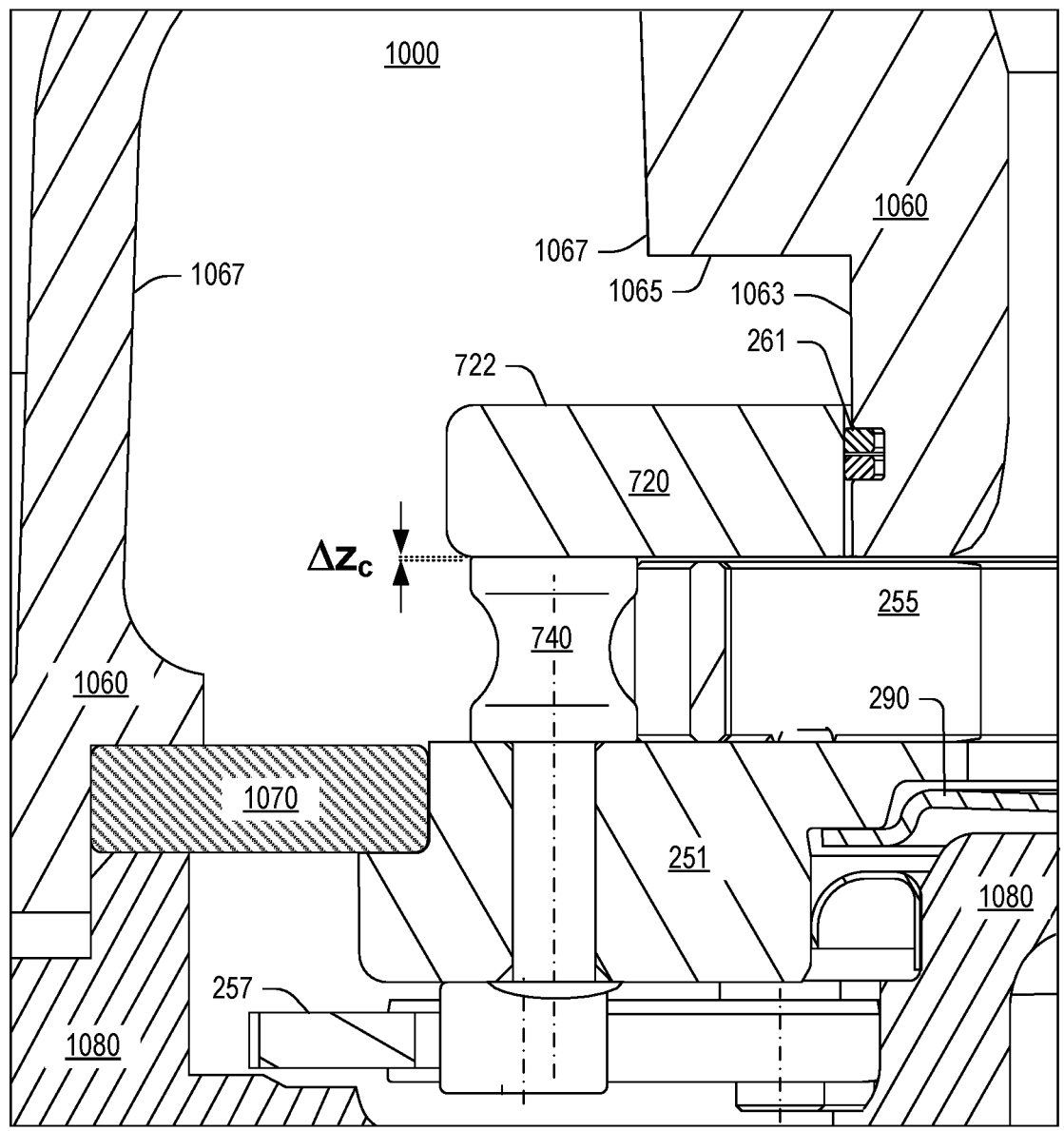
FIG. 10 is a cutaway view of a portion of an example of a turbine assembly of a turbocharger.

FIG. 10 shows an example of a portion of an assembly 1000 that includes a turbine housing 1060, a locating component 1070 and a center housing 1080 along with various components of the assembly 700 such as the substantially annular plate 720 and the spacer 740.

As shown in FIG. 10, the turbine housing 1060 can include a radially extending surface 1065 that meets a volute surface 1067 at a radial distance from an axis of a turbine wheel space (e.g., $z_{th}$) that is to be aligned with a rotational axis of a turbine wheel (e.g., $z_{tw}$). In such an example, the substantially annular plate 720 can be positioned about the shroud portion of the turbine housing 1060 as may be guided by the annular surface 1063 and may be limited as to axial position by the surface 1065. In the example of FIG. 10, the radial length of the substantially annular plate 720 ($\Delta r_p$) is greater than the radial extent of the surface 1065 such that at least a portion of the surface 722 is within the volute regardless of the axial position of the substantially annular plate 720. Further, as shown, the entire surface 722 may be exposed to volute gas (e.g., exhaust gas in the volute) when the surface 722 of the substantially annular plate 720 is not in contact with the surface 1065 of the turbine housing 1060.

In the example of FIG. 10, the locating component 1070 can be annular and limit the axial position of the annular component 251. As shown, the locating component 1070 can be clamped between the center housing 1080 and the turbine housing 1060 such that it is rigidly fixed. The locating component 1070 can also define a portion of the volute such as a base of the volute. As to clamping, the locating component 1070 may be clamped via coupling of the turbine housing 1060 to the center housing 1080 (e.g., via bolts, etc.).

Figure 11:
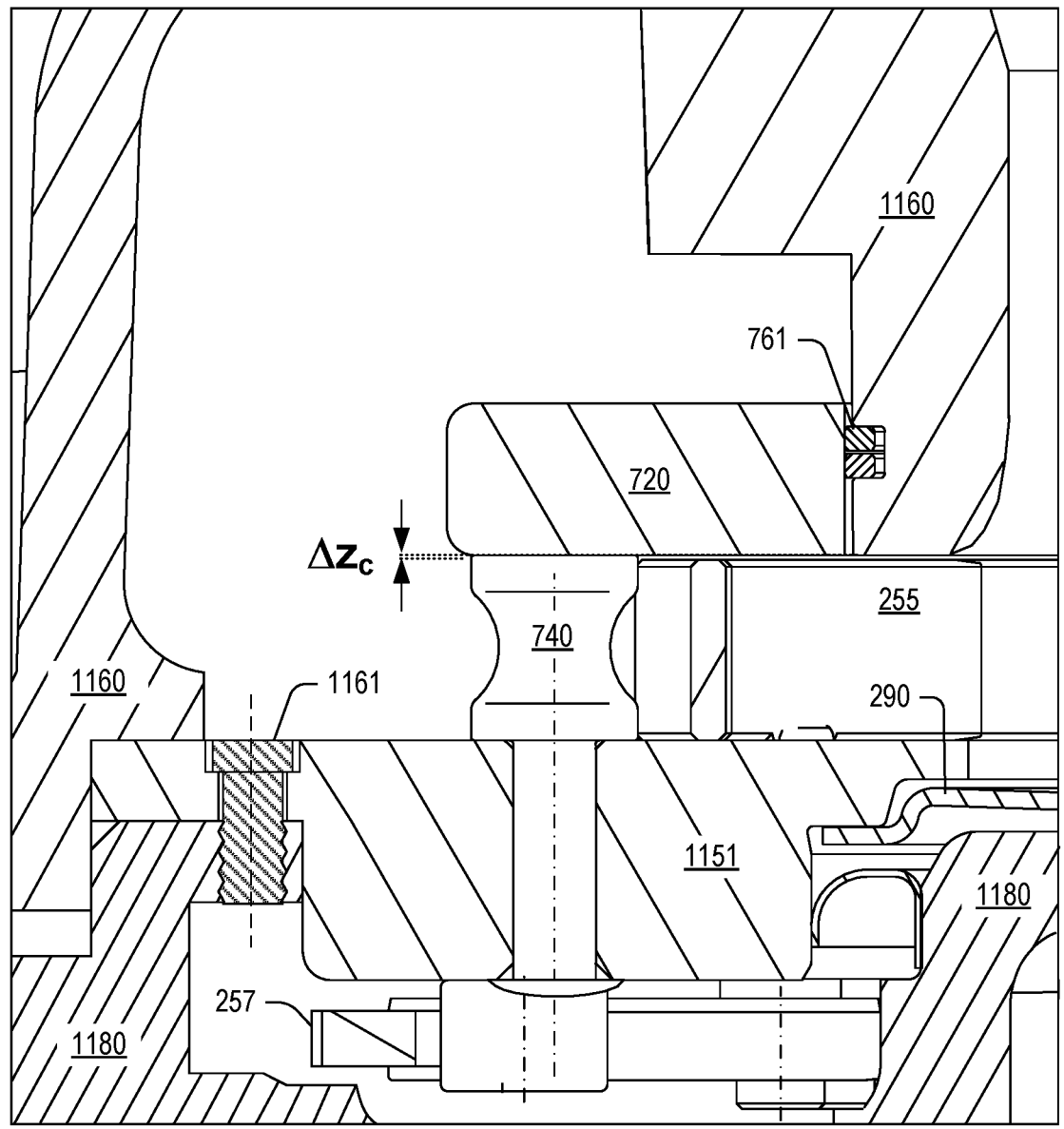
FIG. 11 is a cutaway view of a portion of an example of a turbine assembly of a turbocharger.

FIG. 11 shows an example of a portion of an assembly 1100 that includes an annular component 1151, a turbine housing 1160, a bolt 1161 and a center housing 1180 along with various components of the assembly 700 such as the substantially annular plate 720 and the spacer 740. As shown, the bolt 1161 can connect the annular component 1151 directly to the center housing 1180. In such an example, the heat shield 290 may be fixed between the annular component 1151 and the center housing 1180 where the heat shield 290 does not movably bias the annular component 1151 with respect to the center housing 1180. Or, for example, the heat shield 290 can be utilized to bias the annular component 1151 while the annular component 1151 is fixed via the bolt 1161 (or a plurality of such bolts). In such an example, the biasing force, as applied by the heat shield 290, may help to stabilize the annular component 1151 near its inner perimeter, which may be adjacent to a turbine wheel (e.g., with a desired amount of clearance between the inner perimeter and an outer perimeter of the turbine wheel). In such an example, the assembly 1100 may be referred to as a fixed and biased approach as the annular component 1151 is both fixed and biased.

In the example of FIG. 11, the annular component 1151 is shows as including an opening to receive a portion of the bolt 1161 where the center housing 1180 includes a threaded opening that can receive a portion of the bolt 1161 where threads of the bolt 1161 can mate with threads of the threaded opening to secure the annular component 1151 to the center housing 1180. As to assembly, a cartridge that includes the annular component 1151 may be bolted to the center housing 1180 and then the turbine housing 1160 may be operatively coupled to the center housing 1180.

As an example, a variation of the approach of FIG. 11 can include clamping a portion of the annular component 1151 between the turbine housing 1160 and the center housing 1180 with utilizing the bolt 1161 where, for example, one or more bolts may be utilized to operatively couple the turbine housing 1160 to the center housing 1180 (e.g., to clamp a portion of the annular component 1151 therebetween). In such an example, the heat shield 290 may be configured to apply a biasing force to the annular component 1151, for example, against and away from the center housing 1180. Such an arrangement may be referred to as a fixed and biased approach with respect to the annular component 1151 where, for example, the substantially annular plate 720 may be a floating plate (e.g., or spring biased as in the example of FIG. 9).

As an example, a turbocharger can include a center housing; a bearing disposed in a through bore of the center housing where the through bore of the center housing defines a longitudinal axis; a shaft rotatably supported by the bearing; a compressor wheel operatively coupled to the shaft; a turbine wheel operatively coupled to the shaft; and a turbine housing assembly operatively coupled to the center housing where the turbine housing assembly includes: a turbine housing that includes a concave surface that defines a portion of a volute where the concave surface extends to a substantially annular surface of the turbine housing that extends radially inwardly in a direction toward the longitudinal axis to define a portion of a pressure chamber that is in fluid communication with the volute, a substantially annular plate that defines a portion of the pressure chamber, an annular component, and at least one spacer where the at least one spacer defines a minimum axial distance between the substantially annular plate and the annular component to define a nozzle that is in fluid communication with the volute and in fluid communication with a turbine wheel space defined at least in part by the turbine housing, where, responsive to fluid flow in the volute and through the nozzle to the turbine wheel space, the pressure chamber includes a fluid pressure that exceeds a fluid pressure of the nozzle to apply a biasing force to the substantially annular plate in an axial direction toward the center housing to maintain the minimum axial distance between the substantially annular plate and the annular component as defined by the at least one spacer. In such an example, the substantially annular plate can be a floating plate. A floating plate can be a plate that can move axially in a manner independent of the annular component. Such movement may be, for example, in an operational state of the turbocharger (e.g., during operation as an exhaust driven turbocharger) and/or in a non-operational state of the turbocharger (e.g., where an internal combustion engine is not supplying exhaust to the turbocharger).

As an example, a turbocharger can include a heat shield disposed between a center housing and a second substantially annular plate.

As an example, a turbine housing can include a shroud surface.

As an example, a turbocharger can include a spring disposed between a substantially annular plate and a turbine housing.

As an example, a turbocharger can include at least one bolt that connects an annular component to a center housing.

As an example, a substantially annular plate of a turbocharger can include opposing surfaces that extend between an inner perimeter and an outer perimeter. In such an example, the opposing surfaces can be substantially parallel. As an example, a substantially annular plate can include at least one perimeter that can be defined by a diameter. For example, a substantially annular plate can include an inner perimeter that is defined by a diameter and/or an outer perimeter that is defined by a diameter. As to substantially parallel opposing surfaces, a substantially annular plate may be formed from a stock material that is in the form of a plate with a rectangular cross-sectional profile. In such an example, the substantially annular plate may be stamped or otherwise formed from the stock material. As an example, some amount of machining may be utilized to form a finished substantially annular plate suitable for installation in a turbine assembly of a turbocharger. For example, one or more corners may be machined, which may enhance aerodynamics of the substantially annular plate (e.g., as to a portion that is disposed in a volute, etc.).

As an example, an inner perimeter may optionally include an annular groove that can receive a seal component (e.g., a piston ring, etc.) that can form a seal with respect to a portion of a turbine housing (see, e.g., FIG. 7, 8, 9, 10 or 11 where the seal rings 761 may be inset into the turbine housing and/or inset into the substantially annular plate 720 depending on groove features thereof). Where an annular groove exists on both a substantially annular plate and a turbine housing for receipt of one or more seal rings, such an arrangement can include an adequate axial dimension on one or both grooves to allow for axial movement of the substantially annular plate (e.g., responsive to a pressure differential, etc.).

As an example, a substantially annular plate can include a substantially rectangular cross-sectional profile. For example, a radial line that extends from a central axis of a substantially annular plate through an inner perimeter and an outer perimeter thereof can define a cross-sectional profile with long sides that correspond to opposing surfaces and short sides that correspond to the inner and outer perimeters.

As an example, a turbocharger can include at least one seal ring disposed radially between a turbine housing and a substantially annular plate. In such an example, the substantially annular plate can include an annular groove that seats at least one of the at least one seal ring and/or the turbine housing can include an annular groove that seats at least one of the at least one seal ring.

As an example, a portion of a turbine housing can define a nozzle with respect to an annular component. For example, in FIG. 7, the turbine housing 760 includes a relatively flat surface that can be annular in shape that has a radial span that overlaps with a relatively flat surface of the annular component 251. Thus, in such an example, the nozzle is defined in part the turbine housing, in addition to being defined in part by the substantially annular plate 720. In such an arrangement, the nozzle is, in part, defined by a fixed surface of the turbine housing 760, as fixed to the center housing 280; whereas, at least one of the surface of the substantially annular plate 720 and the surface of the annular component 251 may be movable (e.g., axially). In such an example, a downward axial deflection of the annular component 251 may be accompanied by a downward axial deflection of the substantially annular plate 720 such that a portion of the nozzle, as defined by the turbine housing, becomes greater in its axial dimension than the axial dimension between the substantially annular plate 720 and the annular component 251 (e.g., as determined by the spacer 740).

As an example, a turbocharger can include a nozzle that includes a fixed portion and a floating portion. In such an example, a turbine housing can define in part the fixed portion and a substantially annular plate can define in part the floating portion.

As an example, a turbocharger can include a locating component that is clamped between a center housing and a turbine housing and that axially locates an annular component.

As an example, a turbocharger can include a turbine assembly that includes vanes disposed in a nozzle that is a passage for exhaust from a volute of the turbine assembly to a turbine wheel space defined at least in part by the turbine assembly. In such an example, the vanes may be part of a cartridge that includes a mechanism for adjustment of the vanes, which can change one or more characteristics of throats as defined at least in part by adjacent vanes. Such a change may be responsive to one or more conditions (e.g., exhaust flow, compressor pressure, demand, etc.).

As an example, a minimum axial distance between a substantially annular plate and an annular component as defined by at least one spacer can be greater than a maximum vane height of the vanes. In such an example, the risk of a vane contact (e.g., and being damaged, bound, etc.) can be reduced. As an example, where a nozzle includes a fixed portion as defined by a turbine housing, an annular component can be limited in its axial position to reduce risk of contact between a vane and the turbine housing.

Although some examples of methods, devices, systems, arrangements, etc., have been illustrated in the accompanying Drawings and described in the foregoing Detailed Description, it will be understood that the example embodiments disclosed are not limiting, but are capable of numerous rearrangements, modifications and substitutions.

What is claimed is:
1. A turbocharger comprising:
a center housing;
a bearing disposed in a through bore of the center housing wherein the through bore of the center housing defines a longitudinal axis;
a shaft rotatably supported by the bearing;
a compressor wheel operatively coupled to the shaft;
a turbine wheel operatively coupled to the shaft; and
a turbine housing assembly operatively coupled to the center housing wherein the turbine housing assembly comprises:
a turbine housing that comprises a concave surface that defines a portion of a volute wherein the concave surface extends to a substantially annular surface of the turbine housing that extends radially inwardly in a direction toward the longitudinal axis to an annular surface of the turbine housing to define a portion of a pressure chamber that is in fluid communication with the volute, a substantially annular plate that defines a portion of the pressure chamber wherein the substantially annular plate is a floating plate, at least one seal ring disposed radially between the annular surface of the turbine housing and the substantially annular plate that permits axial movement of the substantially annular plate and radial expansion and contraction of the substantially annular plate without binding to the annular surface of the turbine housing, an annular component, a resilient heat shield disposed between the annular component and the center housing that forcibly biases the annular component in an axial direction away from the center housing, a locating feature that axially locates the annular component as forcibly biased in the axial direction, and at least one spacer wherein the at least one spacer defines a minimum axial distance between the substantially annular plate and the annular component to define a nozzle that is in fluid communication with the volute and in fluid communication with a turbine wheel space defined at least in part by the turbine housing, wherein the at least one spacer is not physically attached or connected to the substantially annular plate such that the substantially annular plate is in its entirety floatable in an axial direction away from the annular component independent of axial movement of the annular component, wherein the substantially annular plate expands and contracts responsive to changes in temperature without being constrained by the at least one spacer, wherein at the minimum axial distance between the substantially annular plate and the annular component, the least one seal ring hinders fluid flow from the pressure chamber to the nozzle, wherein, responsive to fluid flow in the volute and through the nozzle to the turbine wheel space, the pressure chamber comprises a fluid pressure that exceeds a fluid pressure of the nozzle to apply a biasing force to the substantially annular plate in an axial direction toward the center housing to maintain the minimum axial distance between the substantially annular plate and the annular component as defined by the at least one spacer.

2. The turbocharger of claim 1 wherein the turbine housing comprises a shroud surface.

3. The turbocharger of claim 1 comprising a spring disposed between the substantially annular plate and the turbine housing.

4. The turbocharger of claim 1 comprising at least one bolt that connects the annular component to the center housing.

5. The turbocharger of claim 1 wherein the substantially annular plate comprises opposing surfaces that extend between an inner perimeter and an outer perimeter.

6. The turbocharger of claim 5 wherein the opposing surfaces are substantially parallel.

7. The turbocharger of claim 1 wherein the substantially annular plate comprises a substantially rectangular cross-sectional profile.

8. The turbocharger of claim 1 wherein the substantially annular plate comprises an annular groove that seats at least one of the at least one seal ring.

9. The turbocharger of claim 1 wherein the turbine housing comprises an annular groove that seats at least one of the at least one seal ring.

10. The turbocharger of claim 1 wherein a portion of the turbine housing defines the nozzle with respect to the annular component.

11. The turbocharger of claim 1 wherein the nozzle comprises a fixed portion and a floating portion, wherein the annular component defines in part the fixed portion and wherein the substantially annular plate defines in part the floating portion.

12. The turbocharger of claim 1 wherein the locating feature is a component that is clamped between the center housing and the turbine housing to axially locate the annular component.

13. The turbocharger of claim 1 comprising vanes disposed in the nozzle.

14. The turbocharger of claim 13 wherein the minimum axial distance between the substantially annular plate and the annular component as defined by the at least one spacer is greater than a maximum vane height of the vanes.

* * * * *